United States Patent [19]
Ishida et al.

[11] Patent Number: 5,295,234
[45] Date of Patent: Mar. 15, 1994

[54] APPARATUS FOR DISPLAYING A THREE DIMENSIONAL OBJECT WHICH APPEARS SUBSTANTIALLY THE SAME IN DIFFERENT DISPLAY DIRECTIONS BY MODIFYING STORED IMAGE DATA BY A SCALE FACTOR

[75] Inventors: Koichi Ishida, Otsu; Nobutake Watanabe, Matsudo, both of Japan

[73] Assignee: Daikin Industries, Ltd., Japan

[21] Appl. No.: 5,172

[22] Filed: Jan. 15, 1993

Related U.S. Application Data

[63] Continuation of Ser. No. 458,299, Dec. 28, 1989, abandoned.

[30] Foreign Application Priority Data

Dec. 29, 1988 [JP] Japan ................................ 331480

[51] Int. Cl.$^5$ ............................................. G06F 12/02
[52] U.S. Cl. .................................... 395/121; 395/122
[58] Field of Search .............. 395/121, 119, 120, 122, 395/124; 364/413.19

[56] References Cited

U.S. PATENT DOCUMENTS 4,609,917 9/1986 Shen ..................................... 340/729

Primary Examiner—Gary V. Harkcom
Assistant Examiner—Michael S. Smith
Attorney, Agent, or Firm—Beveridge, DeGrandi, Weilacher & Young

[57] ABSTRACT

Image data including depth data on a pixel basis representing a sphere or column are previously generated and stored in a mapping memory. When the sphere or column is to be displayed on a display screen, the image data are read out from the mapping memory. The image data thus read out are mapped to a predetermined region of a memory for display and are processed for hidden surface removal simultaneously.

1 Claim, 4 Drawing Sheets

APPARATUS FOR DISPLAYING A THREE DIMENSIONAL OBJECT WHICH APPEARS SUBSTANTIALLY THE SAME IN DIFFERENT DISPLAY DIRECTIONS BY MODIFYING STORED IMAGE DATA BY A SCALE FACTOR

This application is a continuation of U.S. application Ser. No. 07/458,299 filed on Dec. 28, 1989, now abandoned.

BACKGROUND OF THE INVENTION

1. Field of the Invention

This invention relates to a method and apparatus for displaying a three dimensional object, and more particularly, to a method and apparatus suitable for displaying a sphere, a column and the like on a display screen.

2. Description of Related Arts

In conventional graphics system for displaying images of objects in three dimensions, filling and displaying of the various three dimensional objects are performed by dividing a surface of each three dimensional object to be displayed into a plurality of triangles or quadrilaterals, obtaining color data for every pixel through applying luminance calculation for each divided figure, then filling and displaying each divided figure based on the obtained color data. Display with reality can be accordingly performed by taking each light source vector (a vector starting from a reflecting point and directed to a light source) and each view point vector (a vector starting from a reflecting point and directed to a view point) into consideration, regardless of the species of the three dimensional object. However, a disadvantage of a remarkable increase in the necessary time period between starting operations and visually displaying a three dimensional object, has arisen. This is caused by the fact that a three dimensional object should be divided into a great many triangles or quadrilaterals when the quality of the displayed three dimensional object is to be improved, thereby resulting in greatly increasing the amount of operations and processings.

When the three dimensional object to be displayed is a sphere, the display is scarcely changed even when each light source vector and view point vector are greatly varied. But the same operations and processings as the above-mentioned operations and processings, are needed for every sphere to be displayed, thereby resulting in lengthening the time period for display beyond that which is necessary. Also, when a three dimensional object to be displayed is a column, the display is changed little even when each light source vector and view point vector are greatly varied. But the same operations and processings as the above-mentioned operations and processings, are needed for every column to be displayed, thereby resulting in lengthening the time period for display beyond that which is necessary. The similar disadvantage has arisen when a three dimensional object to be displayed is not a sphere or a column and is not greatly changed even when a light source vectors and a view point vectors vary.

To be more specific, when a three dimensional object is a free shape, the repeated display of the three dimensional object in a graphics system for displaying images of objects in three dimensions, in general is not of great concern. As a result, the above-mentioned disadvantage is not widely recognized. However, in certain situations a sphere, a column and the like are necessary, for example, in displaying of chemical molecular structure used in molecular design. Where a great many spheres and columns are frequently and repetitively displayed on the same screen is one of those situations. As a result, the above-mentioned disadvantage is recognized as a problem.

SUMMARY OF THE INVENTION

It is an object of the present invention to increase display speed for displaying spheres, columns and the like, in graphics system for displaying images of objects in three dimensions, without lowering quality of display.

In order to achieve the above as well as other objects, the present invention provides a method for displaying three dimensional objects comprising steps of;

(1) previously collecting, drawing up and storing into mapping memory means, preliminary source image data on a pixel basis representing a three dimensional object, which is not easily influenced by the display direction or orientation;

(2) reading out the source image data from the mapping memory means and mapping the source image data to a predetermined region corresponding with a display figure, of frame memory means for display as destination image data; and (3) applying hidden surface removal to the source image data thus read out, simultaneously with the mapping operation.

It is most preferable that the three dimensional object is a sphere, but the three dimensional object may be a column or the like.

It is also preferable that the image data on a pixel basis representative of the three dimensional object are previously drawn up based on predetermined color data.

In order to achieve the above and other objects, the present invention also provides an apparatus for displaying a three dimensional object, which comprises;

data holding means for holding source image data on a pixel basis representative of the three dimensional object, which is not greatly influenced by the display direction;

mapping means for reading out the source image data representative of the three dimensional object and for mapping the source image data thus read out to a predetermined region corresponding with a display figure, of frame memory means for display as destination image data; and hidden surface removing means for applying hidden surface removal based on depth data of the source image data representative of the three dimensional object and depth data of the corresponding pixel of the frame memory means for display.

It is preferable that the holding means holds source image data on a pixel basis representative of three dimensional objects, the source image data corresponding with one or more three dimensional objects and being drawn up with determined color data, and that the mapping means reads out the source image data representative of the three dimensional object, drawn up based on desired color data, and that the mapping means maps the source image data representative of the three dimensional object to be displayed, to the predetermined region of the frame memory means for display as destination image data.

According to the method for displaying a three dimensional object, including the above-mentioned steps, source image data on a pixel basis representing one or more three dimensional objects which are not easily influenced by the display direction and the like, is previously generated and stored in the mapping memory means. When the three dimensional object is to be displayed, the source image data is read out from the mapping memory means and is mapped in a predetermined region corresponding with the display figure, of the frame memory means as destination image data. Also, a hidden surface removing operation is carried out simultaneously with the mapping operation so as to display only the part which is not hidden by other image already displayed. That is, a display image similar with a display image obtained by conventional method, is obtained. According to the invention, this method greatly decreases the amount of calculations and processings so as to perform high speed displaying of three dimensional objects, compared with the conventional method, because the calculations on a pixel basis are not needed at all.

When a three dimensional object is a sphere, it is sufficient that source image data on a pixel basis are for a portion which corresponds to a visually displayed portion of the sphere, and as a result, the quality of the display can be improved by determining the division number of the sphere being equal to the division number of the sphere in the conventional method.

When a three dimensional object is a column, the quality of the display may be lowered to some degree because the column is not accurately influenced by a light source vector and a view point vector. However, a column-like representation can be obtained and the column displaying speed is greatly increased.

When source image data on a pixel basis representing one or more three dimensional objects are generated based on predetermined color data, a three dimensional object with a desired color is displayed at high speed only from previously generated image data on a pixel basis with color data which is frequently used and selecting source image data on a pixel basis with corresponding color data.

According to the apparatus for displaying three dimensional objects having the above-mentioned arrangement, source image data on a pixel basis representing three dimensional objects which are not easily influenced by the display direction and the like, is previously generated and stored in the data holding means. When a three dimensional object is to be displayed, the source image data representing the three dimensional object is read out from the data holding means and is mapped in a desired region of the frame memory means for display by the mapping means so as to visually display the corresponding three dimensional object without calculating color data on a pixel basis. Also, a hidden surface removing operation is carried out simultaneously with the mapping operation so as to display only the part of the three dimensional object which is not hidden by other figures already displayed. That is, a display image similar with a display image obtained by conventional method, is obtained. However, this apparatus remarkably decreases the amount of calculations and processings needed so as to perform high speed displaying of three dimensional objects, compared with the conventional apparatus, because the calculations on a pixel basis are not needed at all.

The above, and other objects, features and advantages of this invention will be apparent from the following detailed description of illustrative embodiments which is to be read with the accompanying drawings.

DETAILED DESCRIPTION OF THE PREFERRED EMBODIMENT

Figure 1:
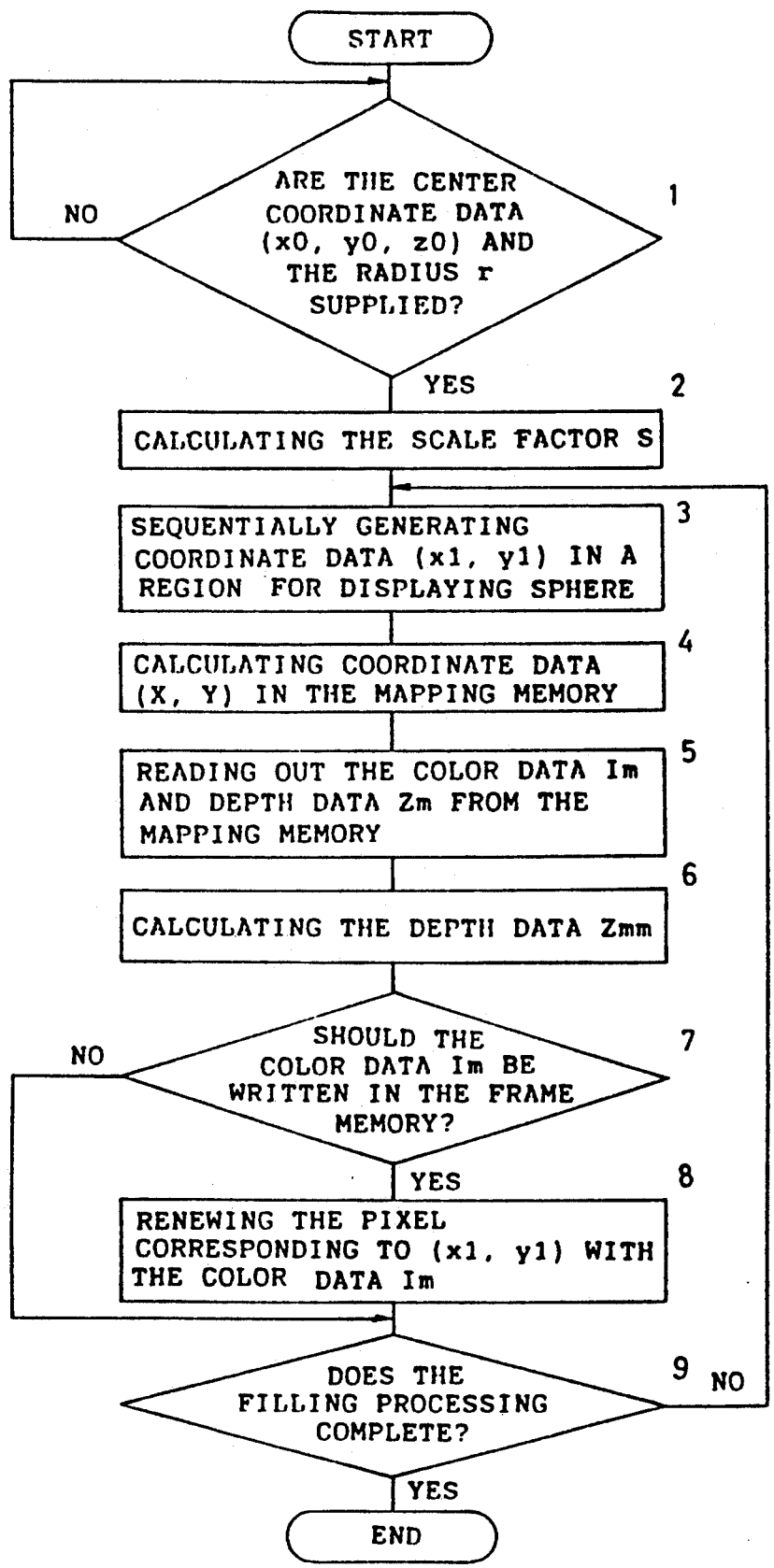
FIG. 1 is a flowchart illustrating a first embodiment of the method for displaying three dimensional objects in accordance with the present invention.

FIG. 1 is a flowchart illustrating a first embodiment of the method for displaying three dimensional objects in accordance with the present invention. The flowchart illustrates operations for displaying spheres.

In step (1), a center coordinate data $(x0, y0, z0)$ and a radius r of a sphere in a frame memory 7 (shown in FIG. 3) are ready to be supplied. After the center coordinate data and radius are supplied, in step (2), a scale factor S is calculated by an equation $S=R/r$, where R is a radius of a sphere being previously generated and stored as a source image data, in a mapping memory 4. In step (3), two dimensional coordinate data $(x1, y1)$ within a region for displaying the sphere, in the frame memory 7, are sequentially generated, where x1 and y1 are determined to satisfy the equations of $x0-r \leq x1 \leq x0+r$ and $y0-r \leq y1 \leq y0+r$. In step (4), two dimensional coordinate data $(X, Y)$ in a mapping memory 4 (shown in FIGS. 2A and 2B) is calculated based on the center coordinate data $(x0, y0)$, the two dimensional coordinate data $(x1, y1)$ thus generated and the scale factor S, where X and Y are calculated by the equations of $X=(x1-x0)*S$ and $Y=(y1-y0)*S$ (* indicates multiplication). In step (5), color data Im and depth data Zm corresponding with the two dimensional coordinate data $(X, Y)$ are read out from the mapping memory 4. In step (6), the depth data Zmm for writing into the frame memory 7 is calculated based on the depth data z0, the depth data Zm thus read out and the scale factor S, where Zmm is calculated by the equation of $Zmm=z0+Zm*S$. Thereafter, in step (7), whether or not color data is to be written into the frame memory 7, is judged based on a comparison result of the depth data Zmm and depth data Zf in the frame memory 7 corresponding with calculated two dimensional coordinate data $(x1, y1)$. When it is judged that the color data are to be written into the frame memory 7, in step (8), a pixel in the frame memory 7 corresponding with the two dimensional coordinate data $(x1, y1)$ is changed to the color data Im. In step (9), whether or not processings for the necessary pixels have been completed, is judged. When it is judged that the processings for necessary pixels are not completed, the processing in step (3) is carried out again. When it is judged in step (7) that the color data is not to be written into the frame memory 7, judgement in step (9) is immediately carried out. And when it is judged in step (9) that the processings for necessary pixels are completed, then the next processing is ready.

The contents of the frame memory 7 is visually displayed on a cathode ray tube display device 8 or the like after the series of processings are repetitively carried out in the required times and other necessary processings are carried out.

SECOND EMBODIMENT

Figure 4:
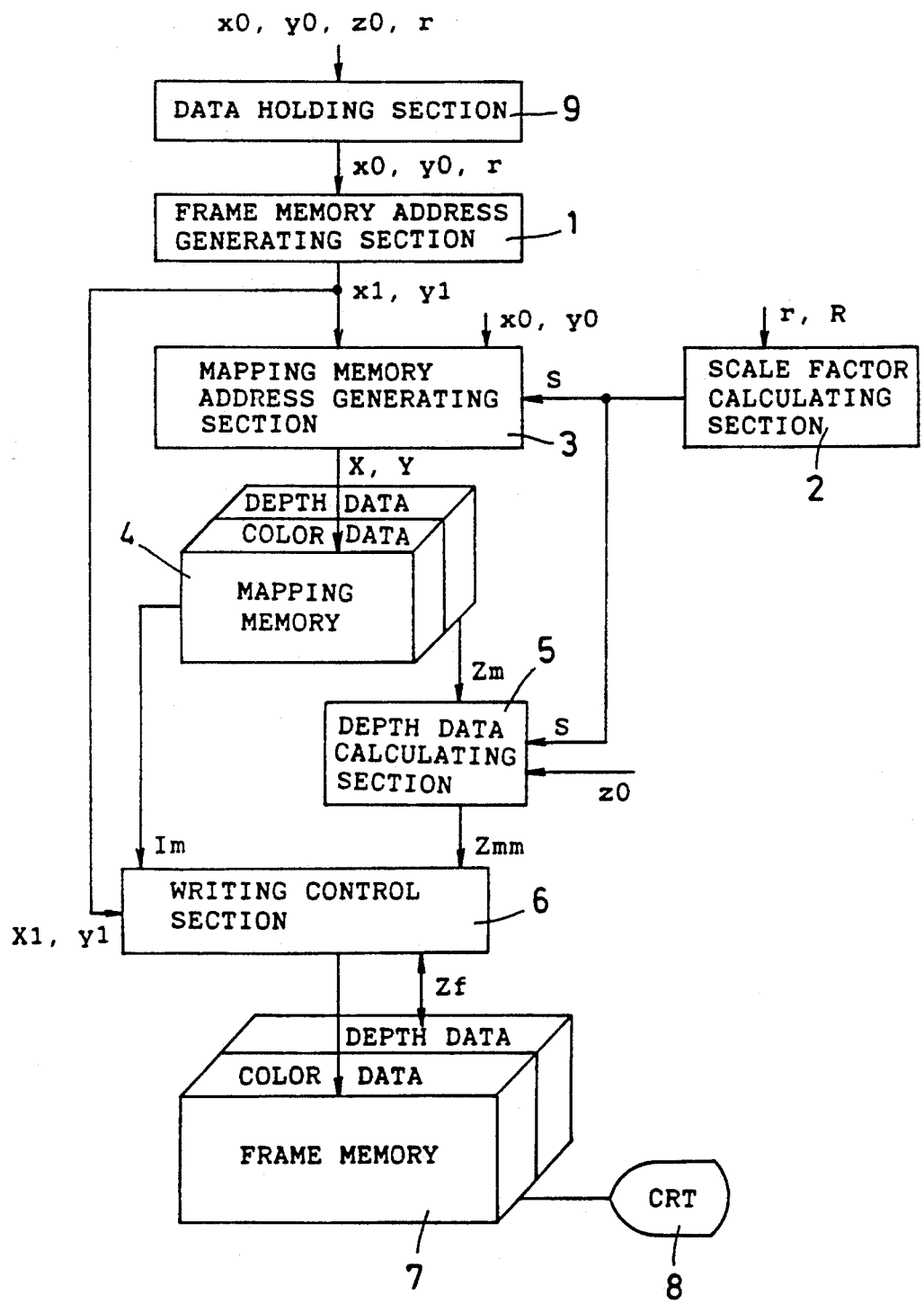
FIG. 4 is a block diagram of a second embodiment of the apparatus for displaying three dimensional objects in accordance with the present invention.

FIG. 4 is a block diagram of a second embodiment of the apparatus for displaying a three dimensional object in accordance with the present invention.

Figure 2A:
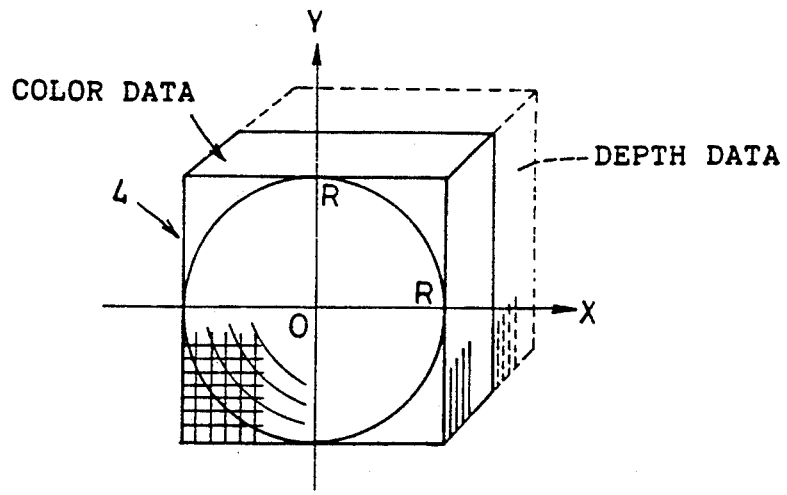
FIGS. 2A and 2B are schematic illustrative views of a mapping memory in which source image data on a pixel basis representing a sphere is stored.
Figure 2B:
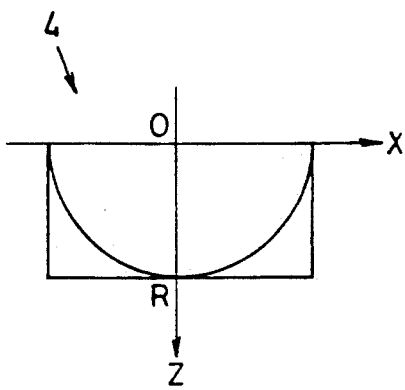
Figure 3:
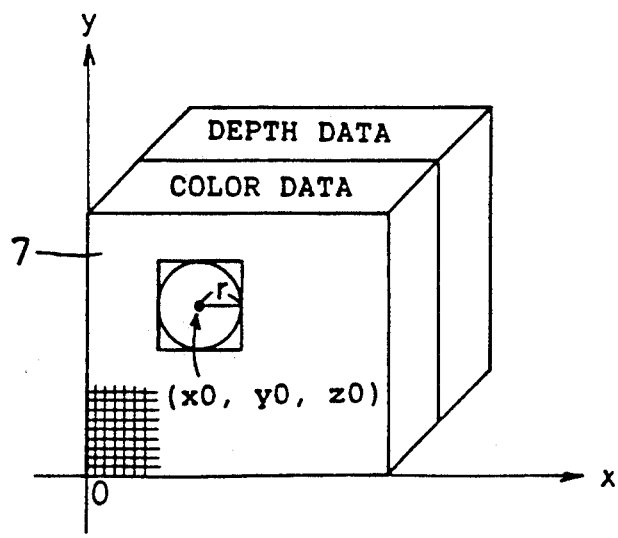
FIG. 3 is a schematic illustrative view of a frame memory.

The apparatus for displaying three dimensional objects includes a mapping memory 4 in which color data corresponding with a sphere, is previously stored as shown in FIG. 2A and relative depth data within the mapping memory 4 is also previously stored as shown in FIG. 2B, a frame memory 7 for storing color data and corresponding depth data, a data holding section 9 for temporarily holding a center coordinate data (x0, y0, z0) and a radius r of a sphere, both determined in the frame memory 7, a frame memory address generating section 1 for sequentially generating two dimensional coordinate data (x1, y1) (where x1 and y1 satisfy the equations of $x0-r \leq x1 \leq x0+r$ and $y0-r \leq y1 \leq y0+r$) of a sphere displaying region in the frame memory 7 based on the radius r and the coordinate data (x0, y0) both read out from the data holding section 9, a scale factor calculating section 2 for calculating a scale factor $S=R/r$ based on the radius r read out from the data holding section 9 and a radius R of the sphere stored in the mapping memory 4, a mapping memory address generating section 3 for calculating two dimensional coordinate data (X, Y) in the mapping memory 4 by the equations of $X=(x1-x0)*S$ and $Y=(y1-y0)*S$ based on the center coordinate data (x0, y0), the two dimensional coordinate data (x1, y1) thus generated and the scale factor S thus calculated, a depth data calculating section 5 for calculating depth data Zmm which is to be written into the frame memory 7, by the equation of $Zmm=z0+Zm*S$ based on the scale factor S, the coordinate data z0 read out from the data holding section 9 and the depth data Zm read out from the mapping memory 4 based on the two dimensional coordinate data (X, Y), a writing control section 6 for judging and controlling whether or not the color data Im read out from the mapping memory 4 based on the two dimensional coordinate data (X, Y), is to be written into the address of the frame memory 7 corresponding with the two dimensional coordinate data (x1, y1), by comparing the depth data Zmm thus calculated and a depth data Zf read out from the frame memory 7, and a cathode ray tube display device 8 for visually displaying based on the contents of the frame memory 7. The color data and depth data of the sphere stored in the mapping memory 4 serve as source image data, while the color data and depth data stored in the frame memory serve as destination image data.

In this embodiment, the scale factor S is calculated by the equation of $S=R/r$ by the scale factor calculating section 2, when the center coordinate data (x0, y0, z0) corresponding with the display region of the sphere in the frame memory 7 and the radius r of the sphere are supplied. Also, the two dimensional coordinate data (x1, y1) are sequentially generated by the frame memory address generating section 1, the coordinate data (x1, y1) corresponding with the display region of the sphere in the frame memory 7. Then, the two dimensional coordinate data (X, Y) corresponding with the coordinate data (x1, y1) are sequentially generated by the mapping memory address generating section 3 based on the scale factor S, the center coordinate data (x0, y0) and the coordinate data (x1, y1) thus sequentially generated. Thereafter, the color data Im and the depth data Zm are read out from the mapping memory 4 based on the coordinate data (X, Y) thus generated. The depth data Zmm to be written into the frame memory 7, is then calculated by the depth data calculating section 5 by the equation of $Zmm=z0+Zm*S$ based on the scale factor S, the coordinate data z0 and the depth data Zm, because the depth data Zm is different from absolute depth data in the frame memory 7. The depth data Zmm thus calculated is then compared with a depth data Zf read out from the frame memory 7, by the writing control section 6. When the depth data Zmm is equal or greater than the depth data Zf, the color data Im is written into the frame memory 7 based on the two dimensional coordinate data (x1, y1). When the color data Im is equal to 0, the writing operation is not carried out because a three dimensional object is not a sphere.

As is apparent from the foregoing, the source image data of a sphere can accurately be calculated on a pixel basis prior to the operations for displaying so as to raise the quality of an actual display image of the sphere without lengthening the necessary time for display. This is because the source image data of the sphere can be previously calculated on a pixel basis with high accuracy. The calculation with high accuracy can be performed because it is sufficient that the color data and depth data of the sphere are previously generated and that only one sphere having a predetermined size is stored in the mapping memory 4. In this case, the time necessary for actually displaying is not lengthened, thereby preventing reduction in the displaying speed.

Figure 5:
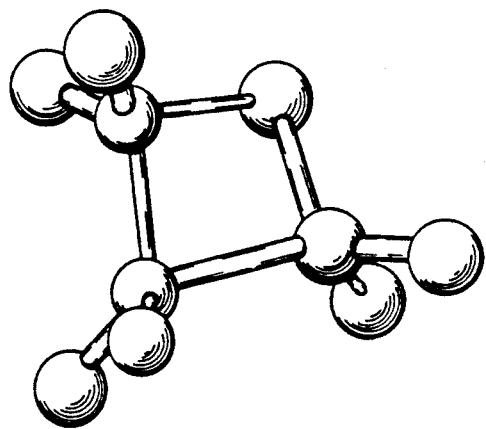
FIG. 5 is a perspective view of a sample display of a molecular structure.

It is also possible that a plurality of spheres each having different color data one from the other, are previously stored in the mapping memory 4, and that one of the spheres can be selected based on designation of color data. In this case, displaying spheres each having desired and different color data, can simply be performed. When the displaying spheres are applied to displaying molecular structure in which a plurality of spheres are to be displayed, as shown in FIG. 5, the molecular structure can be displayed at high speed and with high quality. In this case, the whole image including spheres may be rotated, and the same display for spheres is effective regardless of the rotation angle of the whole image. This results in simplification in the embodiment above-mentioned.

When one or more columns are previously stored in the mapping memory 4, the relationship between the light source vector, view point vector and the others may vary due to the rotation of a whole image so as to result in a display with unnatural shading to some degree. But, when the displaying columns are applied to the displaying molecular structure and the others, a lowering of the quality of the display image as a whole can be ignored because column-like representation can be obtained. As a result, the advantage of high speed displaying is emphasized.

When one or more spheres and one or more columns are previously stored in the mapping memory 4, molecular structure as shown in FIG. 5 is displayed at high speed with high quality by selecting and mapping desired spheres and columns in the mapping memory 4.

In each embodiment, the apparatus is applicable to other three dimensional objects in addition to the sphere and column. It is also possible that index values are stored in the mapping memory 4 and a plurality of look-up tables (information table, for example) and the like can be further provided, so as to deal with the change of color data.

Various modifications and variations will occur to those skilled in the art without departing from the spirit and scope of the invention as defined by the appended claims.

What is claimed is:

1. An apparatus for displaying three dimensional objects on a display screen, comprising:

frame memory means for holding destination image data to be displayed, the destination image data including destination color data and destination depth data;

mapping memory means for holding source image data on a pixel basis, the source image data representing a three dimensional object which is not substantially influenced by display direction and including source color data and source depth data;

data holding means for storing first data which designate an area in said frame memory means, the area in said frame memory means being an area in which the source image data are to be displayed;

first address generation means for generating first addresses which belong to the area, based upon the first data;

scale factor obtaining means for obtaining a scale factor based upon the first data and upon source image data size;

second address generation means for generating second addresses based upon the first address, the first data and the scale factor, the second address being applied to said mapping memory means as a reading address;

depth data generation means for generating first depth data based upon the first data, the source depth data and the scale factor; and write control means for reading the source color data, for performing hidden surface removal based upon the first depth data and the destination depth data, and for writing the source color data in said frame memory means based upon the first address, depending upon hidden surface removal performance.

* * * * *